(12) United States Patent
Li et al.

(10) Patent No.: US 9,237,587 B2
(45) Date of Patent: Jan. 12, 2016

(54) METHOD AND SYSTEM FOR IMPLEMENTING GROUP MESSAGE SERVICE BASED ON CONVERGED SERVICE SYSTEM

(75) Inventors: Fengjun Li, Guangdong Province (CN); Zheng Huang, Guangdong Province (CN); Ali Ghazanfar, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 13/061,280
(22) PCT Filed: Dec. 22, 2008
(86) PCT No.: PCT/CN2008/073641
§ 371 (c)(1),
(2), (4) Date: Feb. 28, 2011
(87) PCT Pub. No.: WO2010/025603
PCT Pub. Date: Mar. 11, 2010

(65) Prior Publication Data
US 2011/0153764 A1 Jun. 23, 2011

(30) Foreign Application Priority Data

Sep. 5, 2008 (CN) .......................... 2008 1 0214387

(51) Int. Cl.
*G06F 15/16* (2006.01)
*H04W 76/00* (2009.01)
(Continued)

(52) U.S. Cl.
CPC ............. *H04W 76/002* (2013.01); *H04L 51/36* (2013.01); *H04L 65/1006* (2013.01); *H04W 4/08* (2013.01); *H04L 12/185* (2013.01); *H04W 4/12* (2013.01); *H04W 8/26* (2013.01)

(58) Field of Classification Search
CPC . H04L 65/1006; H04L 51/36; H04L 65/1016; H04L 61/308
USPC ......................................................... 709/206
See application file for complete search history.

(56) References Cited

U.S. PATENT DOCUMENTS 7,761,552 B2 * 7/2010 Nakamura ........ H04L 29/12584
709/220
7,818,020 B1 * 10/2010 Manroa et al. ................ 455/519
(Continued)

FOREIGN PATENT DOCUMENTS

| CN | 101060716 A | 10/2007 |
| CN | 101136924 A | 3/2008 |
| EP | 1871139 A1 | 12/2007 |

OTHER PUBLICATIONS

International Search Report for PCT/CN2008/073641 dated Jun. 2, 2009.
(Continued)

*Primary Examiner* — Kevin Bates
*Assistant Examiner* — Nazia Naoreen
(74) *Attorney, Agent, or Firm* — Banner & Witcoff, Ltd.

(57) ABSTRACT

A method and system for implementing a group message service based on a converged service system, and the method comprises: a sender converged service client sending a message to a sender's home participant session and message processing module, and the message including a group identifier; said sender's home participant session and message processing module forwarding said message to a controller session and message processing module according to said group identifier; the controller session and message processing module authorizing the sender, and forwarding said message to a destination user's home participant session and message processing module, the destination user corresponding to the group identifier; and said destination user's home participant session and message processing module forwarding said message to a converged service client terminal of said destination user.

20 Claims, 3 Drawing Sheets

(51) Int. Cl.
*H04W 4/08* (2009.01)
*H04L 29/06* (2006.01)
*H04L 12/58* (2006.01)
*H04W 4/12* (2009.01)
*H04W 8/26* (2009.01)
*H04L 12/18* (2006.01)

(56) References Cited

U.S. PATENT DOCUMENTS

| | | | |
|---|---|---|---|
| 2006/0112400 A1* | 5/2006 | Zhang et al. | 719/328 |
| 2008/0113679 A1* | 5/2008 | Sung et al. | 455/466 |
| 2008/0114881 A1* | 5/2008 | Lee et al. | 709/227 |
| 2008/0256117 A1* | 10/2008 | Laurila | H04L 67/02 1/1 |
| 2009/0067408 A1* | 3/2009 | Leppainen | H04L 65/1066 370/350 |
| 2009/0164587 A1* | 6/2009 | Gavita et al. | 709/206 |

OTHER PUBLICATIONS

OMA (Open Mobile Alliance), Instant Messaging using Simple Candidate Version 1.0—Sep. 3, 2008, 189 pages.
OMA (Open Mobile Alliance), Instant Messaging using Simple Architecture, Candidate Version 1.0—Sep. 3, 2008, 41 pages.
3GPP TS 23.204, V8.2.0 (Jun. 2008), 3rd Generation Partnership Project; Technical Specification Group Services and System Aspects; Support of Short Message Service (SMS) over generica 3GPP Internet Protocol (IP) access; Stage 2 (Release 8), 37 pages.

* cited by examiner

METHOD AND SYSTEM FOR IMPLEMENTING GROUP MESSAGE SERVICE BASED ON CONVERGED SERVICE SYSTEM

TECHNICAL FIELD

The present invention relates to the service convergence field, and particularly, to a method and system for implementing a group message service based on a converged service system.

BACKGROUND OF THE RELATED ART

In the network trend of evolving to be based on IP, the traditional message service and the voice service are required to transfer to the IP-based next generation network. Standard groups of 3rd Generation Partnership Project (3GPP), 3GPP2 and Telecommunication and Internet Converged Service and Protocols for Advanced Networks (TISPAN) all consider the Session Initiation Protocol (SIP) as the basic protocol of the next core network. It has been a truth that the IP network applying the SIP is the network basis for service applications. In the background of the network convergence, a plurality of standard organizations has begun to research the converged service system.

The converged service system integrates various existing service functions, and can implement the practical experiences of users using services such as short messages, multimedia messages, email, and voice and so on. The converged service system does not mechanically implement the superposition of various services, but adopts a new architecture to implement the converged service experiences based on the next network. When a user uses services, the user only needs to pay attention to whether it is in an instant messaging way or not, but does not need to pay attention to which form of service is used. The converged service system can also support existing group services, including the group message and voice services, but there is not a particular implementation method yet.

SUMMARY OF THE INVENTION

The technical problem to be solved in the present invention is to provide a method and system for implementing a group message service on a converged service system.

In order to solve the above problem, the present invention provides a method for implementing a group message service based on a converged service system, and the method comprises:

a sender converged service client sending a message to a sender's home participant session and message processing module, and the message including a group identifier;

said sender's home participant session and message processing module forwarding said message to a controller session and message processing module according to said group identifier;

the controller session and message processing module authorizing the sender, and forwarding said message to a destination user's home participant session and message processing module, the destination user corresponding to the group identifier; and said destination user's home participant session and message processing module forwarding said message to a converged service client of said destination user.

Furthermore, the above method may have the following features: the method further comprises:

said destination user's home participant session and message processing module sending a message delivery notification to said controller session and message processing module, said controller session and message processing module forwarding said message delivery notification to said sender's home participant session and message processing module, and said sender's home participant session and message processing module forwarding said message delivery notification to said converged service client of the sender.

Furthermore, the above method may have the following features: said message delivery notification is a failure delivery notification message generated by said destination user's home participant session and message processing module, and after receiving a failure response message transmitted by a converged service client of said destination user, said destination user's home participant session and message processing module generates the failure delivery notification message.

Furthermore, the above method may have the following features: said message delivery notification is received from the converged service client of the destination user by said destination user's home participant session and message processing module, and after receiving said notification, said converged service client of the destination user sends the message delivery notification to said destination user's home participant session and message processing module.

Furthermore, the above method may have the following features: when there are a plurality of destination users, said controller session and message processing module sets a period of waiting time when receiving the first message delivery notification returned by said a plurality of destination users, and, after the waiting time is due, combines a plurality of message delivery notifications returned by said a plurality of destination users and sends the combined message delivery notification to the sender's home participant session and message processing module.

Furthermore, the above method may have the following features: when there are a plurality of destination users, said controller session and message processing module directly forwards a plurality of message delivery notifications returned by said a plurality of destination users to the sender's home participant session and message processing module.

Furthermore, the above method may have the following features: when receiving a repeated message delivery notification, said controller session and message processing module discarding the repeated message delivery notification, or directly forwarding the repeated message delivery notification to the sender's home participant session and message processing module.

Furthermore, the above method may have the following features: said sender converged service client, sender's home participant session and message processing module, controller session and message processing module, destination user's home participant session and message processing module, and said converged service client of said destination user interact with one another through a Session Initiation Protocol/Internet Protocol (SIP/IP) core bearer network.

Furthermore, the above method may have the following features: said message also includes a converged service identifier, and said sender converged service client sending the message to the sender's home participant session and message processing module comprises the following steps of:

the sender converged service client sending the message to the SIP/IP core bearer network; and said SIP/IP core bearer network forwarding the message to the participant session and message processing module of the sender's home converged service system according to said converged service identifier.

Furthermore, the above method may have the following features: said sender's home participant session and message processing module forwarding said message to the controller session and message processing module according to the group identifier further comprises:

said sender's home participant session and message processing module authorizing said user, and sending the message to said SIP/IP core bearer network if the user has permission to send the message;

the SIP/IP core bearer network sending said message to a SIP/IP core bearer network to which a group information's home converged service system belongs according to the group identifier, namely forwarding the message to a SIP/IP core bearer network managing the group; and the SIP/IP core bearer network managing the group sending said message to a controller session and message processing module of the group information's home converged service system.

Furthermore, the above method may have the following features: when said message includes indication information of requiring a message delivery notification and anyone of the sender's home participant session and message processing module, the destination user's home participant session and message processing module or said controller session and message processing module requires blocking sending of the message delivery notification, the module returning the message delivery notification to the sender converged service client to inform the sender that the system does not support the message delivery notification.

To solve the above problems, the present invention provides a system for implementing a group message service, and the system comprises:

a sender's home participant session and message processing module, which is used to receive a message from a sender converged service client, and forward said message to a controller session and message processing module according to a group identifier included in said message;

the controller session and message processing module, which is used to receive the message from the participant session and message processing module, authorize a sender, and forward said message to a destination user's home participant session and message processing module, wherein the destination user corresponds to the group identifier; and the destination user's home participant session and message processing module, which is used to forward said message to a converged service client of said destination user.

Furthermore, the above system may have the following features: the system further comprises:

a SIP/IP core bearer network, which is used to bear message interaction among said sender converged service client, the sender's home participant session and message processing module, the controller session and message processing module, the destination user's home participant session and message processing module, and the converged service client of said destination user.

Furthermore, the above system may have the following features: said destination user's home participant session and message processing module also sends a message delivery notification to said controller session and message processing module;

said controller session and message processing module receives said message delivery notification, and when there are a plurality of destination users, and when said controller session and message processing module receives the first message delivery notification returned by these a plurality of destination users, said controller session and message processing module sets a waiting time and combines a plurality of message delivery notifications returned by said a plurality of destination users when the waiting time is due and then sends the combined message delivery notification to the sender's home participant session and message processing module; and said sender's home participant session and message processing module sends said message delivery notification to said sender converged service client.

Comparing with the prior art, said method for implementing the group message service based on the converged service system of the present invention can implement the group message service function in the converged service client to facilitate the usage of the converged service system. by users

PREFERRED EMBODIMENTS OF THE PRESENT INVENTION

Figure 1:
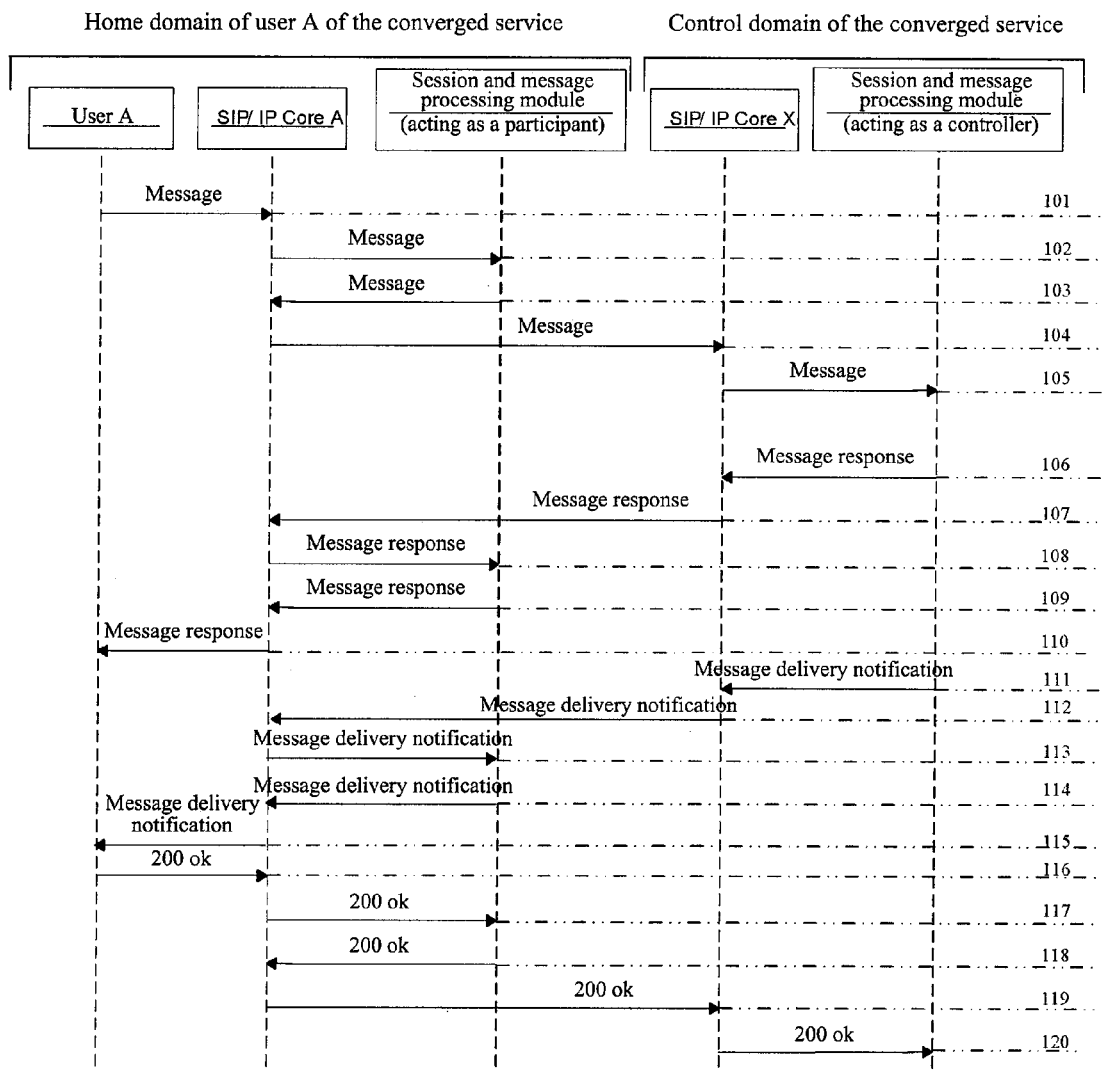
FIG. 1 is a flow of a group message service at sender side.

The converged service system in the present invention mainly comprises a SIP/IP CORE bearer network, a controller session and message processing module, a participant session and message processing module, and a converged service client terminal, wherein The SIP/IP CORE bearer network, which is a bearer network of the converged services, is a SIP signaling network based on the IP network and responsible for transferring messages between converged service users and between a converged service user and the converged service system side.

The session and message processing module is responsible for processing of session interaction and message interaction of the converged services, acting as a participant or a controller:

When acting as a participant, the session and message processing module mainly performs format check and authentication and so on for the initiation and receive of the user's session and message, and is called a participant session and message processing module;

When acting as a controller, the session and message processing module mainly performs control and authentication for the group services, and is called a controller session and message processing module;

The converged service client interacts with the session and message processing module to implement functions provided by the converged service system. The converged service client comprises the sender converged service client and the receiver converged service client.

Usually, the converged service system includes the converged service user home domain and the converged service control domain, the converged service client and the home session and message processing module (namely the participant session and message processing module) belongs to the converged service user home domain. In a session, a sender and a receiver belong to the same or different the converged service user home domains. The controller session and message processing module belongs to the converged service control domain, and could also be in the same domain with the sender and the receiver. The interaction between different domains needs to be carried out through the SIP/IP CORE bearer network. The interaction between the converged service client terminal and the session and message processing module is also carried out through the SIP/IP CORE bearer network. Particularly, the sender converged service client, the participant session and message processing module to which the sender belongs, the controller session and message processing module, the participant session and message processing module to which the receiver belongs, and the receiver converged service client terminal interact with one another through the SIP/IP CORE bearer network.

The method for implementing the group message service based on the converged service system according to the present invention comprises the following steps:

Step 1, a sender converged service client sends a message to the participant session and message processing module of the converged service system, the message includes a group identifier, a sender identifier and the indication information of requiring an acknowledgement of receipt, and the indication information of requiring the acknowledgement of receipt can also not be included.

Step 2, the participant session and message processing module forwards the message to the controller session and message processing module, and the controller session and message processing module judges whether the group is managed by the local domain according to the group identifier, and if not, forwards the message to the controller session and message processing module of the converged service system to which the group identifier belongs, or, carries out the step 3 directly;

The participant session and message processing module sends the message to the SIP/IP bearer network, and the SIP/IP bearer network locates the corresponding session and message processing module according to the group identifier.

The participant session and message processing module can also authenticate the sender, and if the sender has no permission to send the message, ends the flow, otherwise, the participant session and message processing module sends the message to the controller session and message processing module.

Step 3, the controller session and message processing module judges whether the sender has permission to send the message according to the group identifier, sender identifier and other policy information, such as the user policy, and the operator policy, and if the sender has no permission to send the message, the controller session and message processing module refuses to forward the message, and returns a failure message to the sender converged service client; otherwise, the controller session and message processing module authorizes the sender and continues the subsequent steps;

Step 4, the controller session and message processing module obtains destination user information from the group information according to the group identifier, and sends the message to the participant session and message processing module to which the destination user belongs, and this participant session and message processing module forwards the message to the converged service client of the destination user;

The group information corresponding to the group identifier is stored in an external server or the controller session and message processing module.

Step 5, when the message includes the indication information of requiring the acknowledgement of receipt, among the participant session and message processing module to which the sender belongs, the participant session and message processing module to which the destination user belongs or the controller session and message processing module to which the group identifier belongs, if anyone needs to block the sending of the receipt acknowledgement message according to the regulations of the operator policies, this session and message processing module returns the receipt acknowledgement message to the sender converged service client, and ends the subsequent flows, otherwise carries out the step 6;

If the sender specifies that a receipt acknowledgement is required when the sender sends the message, while the operator blocks the sending of a receipt acknowledgement or does not support sending a receipt acknowledgement, the system sends a receipt acknowledgement message of refusing to send a receipt acknowledgement to the sender converged service client to inform the sender that the system does not support receipt acknowledgement messages.

Step 6, if the destination user judges that a receipt acknowledgement message needs to be returned, the converged service client of the destination user sends a receipt acknowledgement message to the participant session and message processing module to which it belongs, and this participant session and message processing module sends the receipt acknowledgement message to the controller session and message processing module, or the participant session and message processing module to which the destination user belongs sends the receipt acknowledgement message to the controller session and message processing module;

Step 7, upon receiving the receipt acknowledgement message, the controller session and message processing module judges whether the receipt acknowledgement message is the one sent repeatedly, and directly discards the receipt acknowledgement message if it is sent repeatedly, and sets a certain period of waiting time for the latest received receipt acknowledgement message, and when the waiting time is due, the controller session and message processing module arranges the receipt acknowledgement message and then sends it to the participant session and message processing module to which the sender belongs; or directly forwards the received receipt acknowledgement message to the participant session and message processing module to which the sender belongs;

Arranging the received receipt acknowledgement message refers to arranging a plurality of received receipt acknowledgement messages into one receipt acknowledgement message.

Step 8, the participant session and message processing module to which the sender belongs sends the received receipt acknowledgement message to the sender converged service client.

Below it will further describe the present invention with reference to the particular application examples.

Three converged service users A, B and C are users belonging to a pre-defined group, and users B and C are users belonging to the same converged service domain, and the converged service domain which manages the group is another converged service domain which is different from that these three users belong to. In the converged service domain, the SIP/IP CORE bearer network refers to the bearer network of the converged services, and it is a SIP signaling network based on the IP network, and it is responsible for transferring messages between the converged service users and between a converged service user and the converged service system side. This example will take the IP Multimedia Subsystem (IMS) network as an example. The participant session and message processing module refers to the session and message processing module which is only responsible for checking the validity of accessing a converged service by a user and checking the request format and so on. The controller session and message processing module refers to the session and message processing module which is responsible for the routing processing for the session and message and managing the session and message and so on.

The group message service is implemented based on above key modules of the converged service system and the bearer network, and the particular flow is divided into two parts to be described:

The service flow on the message sender side is shown in FIG. 1, and this system comprises the converged service user home domain and the converged service control domain, wherein the converged service user home domain comprises the converged service client, the SIP/IP CORE bearer network and the participant session and message processing module, and the converged service control domain comprises the SIP/IP CORE bearer network and the controller session and message processing module. The particular flow comprises:

Step 101: the converged service client of the user A sends a message to the SIP/IP CORE bearer network, the whole length of the message is less than 1300 bytes, and the content of the message is sent directly using the Message method based on the SIP, wherein the request_uri field is the predefined group identifier information, the P_Preferred_Identity field includes the identifier information of the sender, and the Accept_Contact field includes the converged service identifier information;

The converged service identifier is used by the SIP/IP CORE bearer network to determine which application server is to choose, namely which converged service system is to choose.

Step 102: after receiving the message, the SIP/IP CORE bearer network forwards a message sending request to the user A's home converged service system according to the sender identifier and the converged service identifier information of the Accept_Contact field;

Step 103: the session and message processing module of the user A's home converged service system (namely the participant session and message processing module) authenticates the user, and judges whether the user A has the permission to send the message, and if the user A does not have the permission, ends this flow, or sends the message to the SIP/IP CORE bearer network;

Step 104: the SIP/IP CORE bearer network sends the message to the SIP/IP CORE bearer network to which the group information's home converged service system belongs, namely, forwards the message to the SIP/IP CORE bearer network which manages this group;

Step 105: the SIP/IP CORE bearer network which manages this group sends the message to the group information's home converged service system, and the controller session and message processing module of this converged service system carries out the subsequent processes;

Steps 106 to 110: the controller session and message processing module returns a response message of the message to the converged service client of the user A along the sending path of the message;

Step 111: after receiving a Message Delivery Notification from the receiver, the controller session and message processing module sends the Message Delivery Notification to the SIP/IP CORE bearer network in the control domain;

Step 112: the SIP/IP CORE bearer network in the control domain sends the Message Delivery Notification to the SIP/IP CORE bearer network in the home domain of the sender;

Step 113: the SIP/IP CORE bearer network in the home domain of user A sends the Message Delivery Notification to the converged service system of the user A for processing by the participant session and message processing module;

Step 114: the participant session and message processing module sends the Message Delivery Notification to the SIP/IP CORE bearer network in the home domain;

Step 115: the SIP/IP CORE bearer network sends the Message Delivery Notification to the converged service client of the user A;

Steps 116 to 120: the user A returns 200 ok to the controller session and message processing module in the control domain along the Message Delivery Notification sending path.

Figure 2:
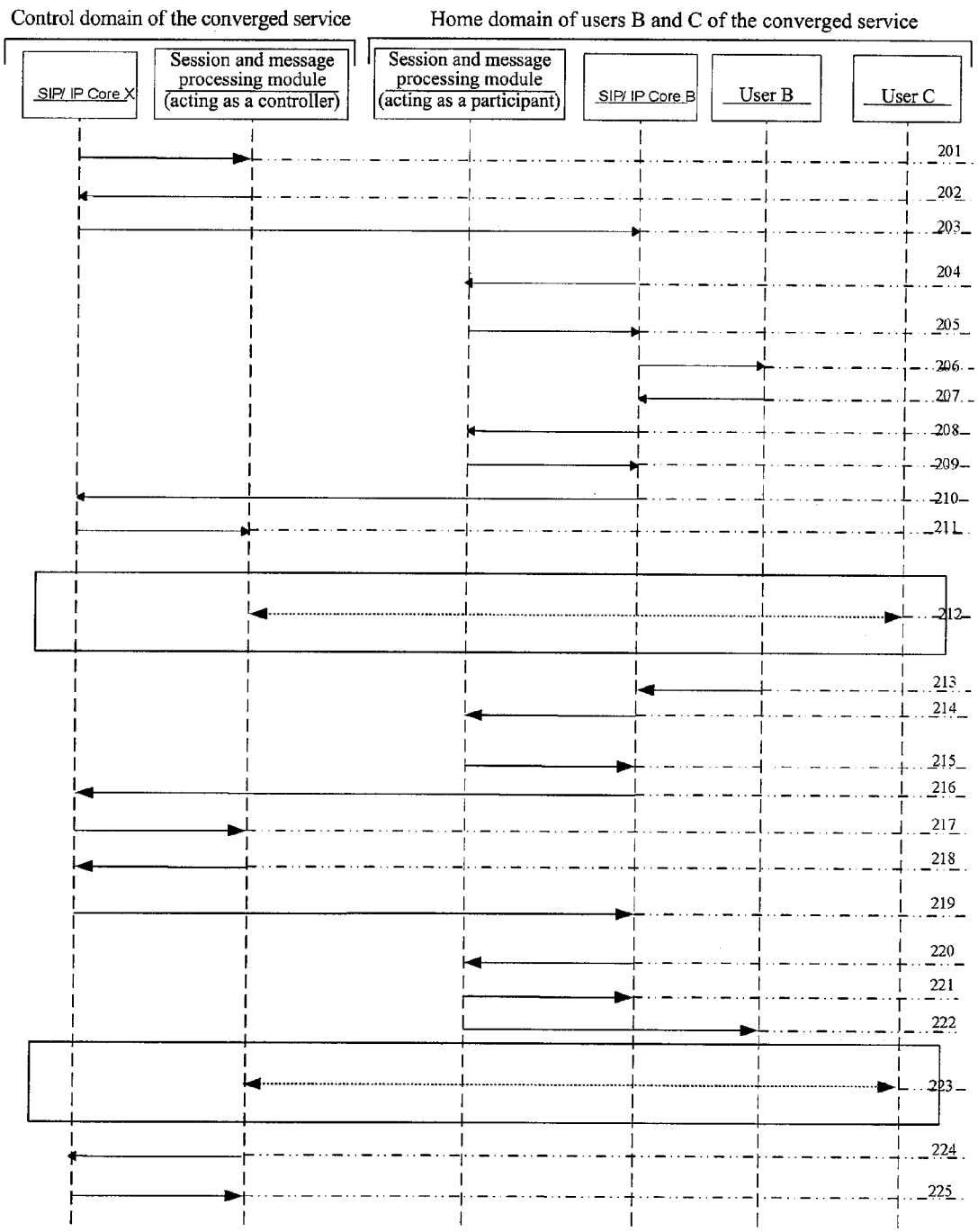
FIG. 2 is a flow of successful message delivery in group message service at receiver side.

A service flow on the message receiver side, as shown in FIG. 2, is the flow of delivering the user message successfully, which particularly comprises:

Step 201: the SIP/IP CORE bearer network in the control domain sends the message to the controller session and message processing module, and if the controller session and message processing module judges the group is a group which is managed by the local domain according to the group identifier and the sender has permission to send content to this group, the controller session and message processing module authorizes the sender, and extracts the destination user address from the group information;

Step 202: the controller session and message processing module sends a message to the SIP/IP CORE bearer network in the control domain, wherein the receiver is the destination user address, such as the address of the user B;

Step 203: the SIP/IP CORE bearer network in the control domain sends the message to the SIP/IP CORE bearer network where the destination user (such as the user B)'s home converged service system is;

Step 204: the SIP/IP CORE bearer network sends the message to the user B's home converged service system according to the destination user address information for processing by the participant session and message processing module of the user B's home converged service system;

Step 205: the participant session and message processing module sends the message to the SIP/IP CORE bearer network in the home domain;

Step 206: the SIP/IP CORE bearer network in the home domain sends the message to the converged service client of the user B;

Steps 207 to 211: the converged service client of the user B returns 200 ok to the controller session and message processing module in the control domain along the message sending path in steps 202 to 206;

Step 212: using the similar way of steps 202 to 211, the controller session and message processing module in the control domain extracts the next destination user address from the group information, such as the address of the user C, and sends the message to the converged service client of the user C, and the user C returns 200 ok to the controller session and message processing module in the control domain;

Step 213: the converged service client of the user B sends a message delivery notification to the SIP/IP CORE bearer network in the local domain;

Wherein there is no sequence between the step 213 and step 212, and the converged service client of the user B returns a message delivery notification after receiving the message and confirming successful or failed receipt of the message.

Step 214: the SIP/IP CORE bearer network forwards the message delivery notification to the participant session and message processing module in the local domain;

Step 215: the participant session and message processing module forwards the message delivery notification to the SIP/IP CORE bearer network in the local domain;

Step 216: the SIP/IP CORE bearer network of the user B's home converged service system sends the message delivery notification to the SIP/IP bearer network in the control domain;

Step 217: the SIP/IP CORE bearer network in the control domain sends the message delivery notification to the controller session and message processing module;

Steps 218 to 222: after receiving the message delivery notification of the user B, the controller session and message processing module returns 200 ok to the user B along the sending path of the message delivery notification.

Step 223: using the similar way of the steps 213 to 222, the converged service client of the user C sends a message delivery notification to the controller session and message processing module in the control domain, and the controller session and message processing module in the control domain returns 200 ok to the converged service client of the user C;

Step 224: if the message delivery notification of the user C is not received immediately after the message delivery notification of user B is received (i.e. they are not received simultaneously), the controller session and message processing module sets a timer for waiting for the arrival of the message delivery notification of the user C;

If the message delivery notification of the user C arrives within the time set by the timer, the controller session and message processing module combines the two message delivery notifications into one message delivery notification, and sends it to the SIP/IP bearer network, otherwise directly sends the message delivery notification returned by the user B to the SIP/IP CORE bearer network;

If the user B sends a repeated message delivery notification, the controller session and message processing module discards the repeated message delivery notification, or when receiving a repeated message delivery notification, the session and message processing module directly forwards the received message delivery notification to the SIP/IP CORE bearer network;

If there are a plurality of destination users, the controller session and message processing module set a timer when receiving the first message delivery notification returned by these destination users, and combines the returned several message delivery notifications (for example, into one message delivery notification) of the plurality of destination users when the time set by the timer is due and sends the combined message delivery notification to the SIP/IP CORE bearer network; or directly forwards the several message delivery notifications returned by a plurality of destination users to the SIP/IP CORE bearer network.

If there is only one destination user, it does not need to set a timer, and after receiving the message delivery notification, the controller session and message processing module directly forwards it to the SIP/IP CORE bearer network.

Step 225: the SIP/IP CORE bearer network returns a response message corresponding to the message delivery notification to the controller session and message processing module, and after receiving this message, the controller session and message processing module confirms that a certain message delivery notification has been sent, and records it to avoid sending it repeatedly in the subsequent procedure.

Figure 3:
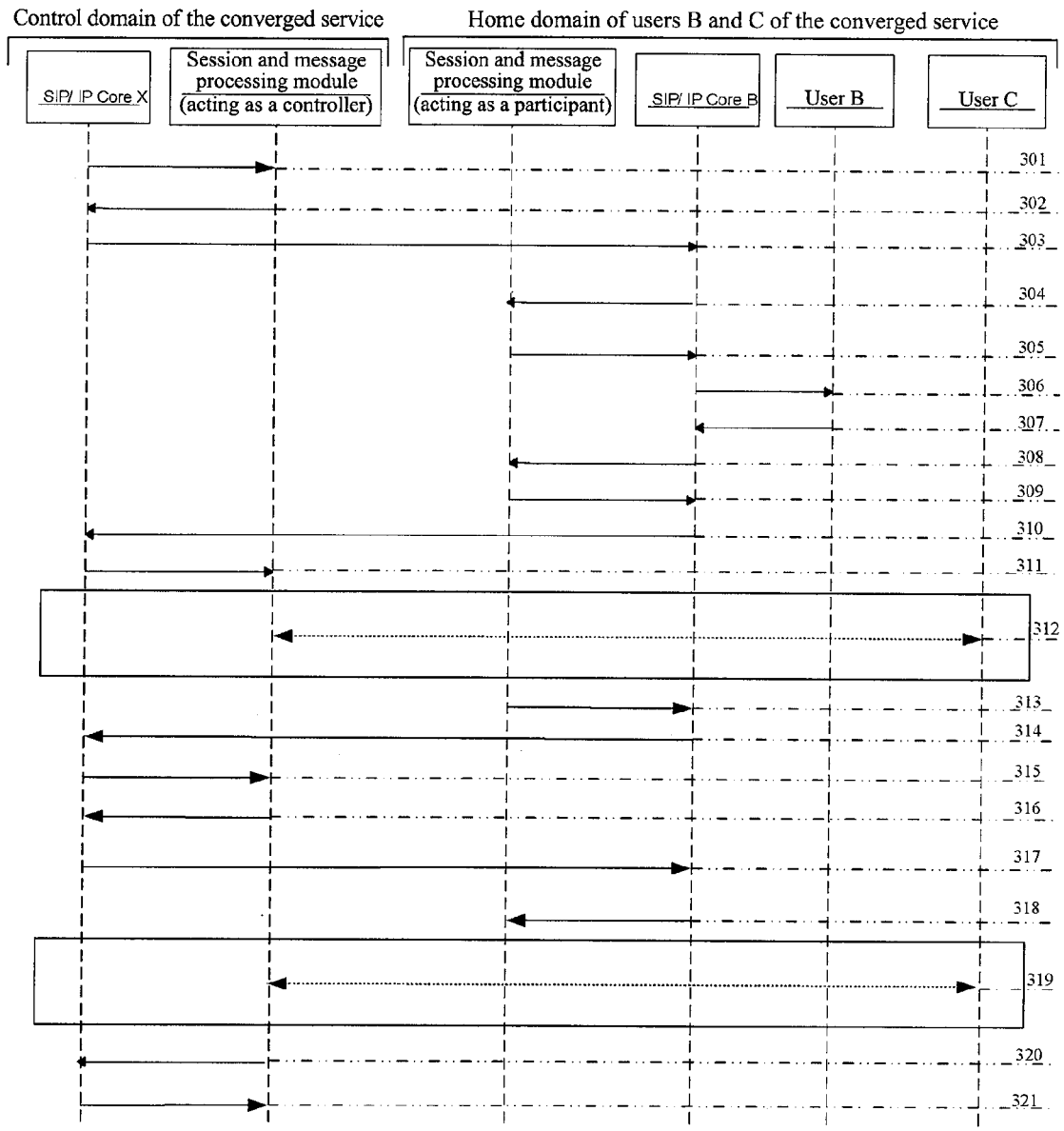
FIG. 3 is a flow of failed message delivery in group message service at receiver side.

FIG. 3 shows a flow of the sender requesting for a failure delivery notification (the user B fails, and the user C succeeds).

Wherein steps 301 to 306 are the same with steps 201 to 206;

The differences from the FIG. 2 are in the steps 307 to 311 and steps 313 to 321:

Steps 307 to 311: the converged service client of the user B returns non OK to the controller session and message processing module in the control domain along the message sending path;

Step 312: similar to the way of step 212, the message is sent to the converged service client of the user C, and the converged service client of the user C returns 200 OK to the controller session and message processing module in the control domain;

Step 313: the user B's home participant session and message processing module judges that the received response message of non OK is a failure response and the sender requires a failure delivery notification message, then the participant session and message processing module sends a failure delivery notification message to the SIP/IP CORE bearer network B.

Steps 314 to 318: similar to the steps 216 to 220 in FIG. 2, wherein the message delivery notification messages in each step are the failure delivery notification messages.

Step 319, similar to the step 223, the user C's home participant session and message processing module sends a message delivery notification message to the controller session and message processing module, and the controller session and message processing module returns 200 ok to the converged service client of the user C.

Steps 320 to 321: the same with the steps 224 to 225 in FIG. 2.

Certainly, the present invention can also have other various examples. Various modifications and variations may be made on the present invention without deviating from the spirit and essence of the present invention, and these corresponding modifications and variations are all covered by the protection scope of attached claims of the present invention.

INDUSTRIAL APPLICABILITY

Compared with the prior art, said method for implementing the group message service based on the converged service system of the present invention can implement the group message service function in the converged service client, which facilitates the usage of the converged service system by the users.

We claim:

1. A method for implementing a group message service based on a converged service system, the method comprising:

a sender converged service client of a user which has joined a group in the group message service sending a message to a sender's home network participant session and message processing module, and the message including a group identifier of said group;

said sender's home network participant session and message processing module authenticating the sender and judging whether the sender has permission to send the message, when the sender has the permission to send the message, said sender's home network participant session and message processing module forwarding said message to a network controller session and message processing module according to said group identifier, wherein said network controller session and message processing module is responsible for routing processing for sessions and messages;

after the network controller session and message processing module receives said message, the network controller session and message processing module judging whether said group is managed by a local domain of the network controller session and message processing module according to the group identifier, and if not, forwarding said message to a network controller session and message processing module of the converged service system to which the group identifier belongs;

when the network controller session and message processing module determines that said group is managed by the local domain, the network controller session and message processing module judging whether the sender has permission to send the message to the group, when the sender has the permission to send the message to the group, the network controller session and message processing module authorizing the sender, and forwarding said message to a destination user's home network participant session and message processing module, the destination user corresponding to the group identifier; and said destination user's home network participant session and message processing module forwarding said message to a converged service client of said destination user;

thereby the converged service clients which belong to the converged service system and have joined the same group implementing the group message service.

2. The method as claimed in claim 1, said method further comprising:

said destination user's home network participant session and message processing module sending a message delivery notification to said network controller session and message processing module, said network controller session and message processing module forwarding said message delivery notification to said sender's home network participant session and message processing module, and said sender's home network participant session and message processing module forwarding said message delivery notification to said sender converged service client.

3. The method as claimed in claim 2, wherein said message delivery notification is a failure delivery notification message generated by said destination user's home network participant session and message processing module, and after receiving a failure response message transmitted by the converged service client of said destination user, said destination user's home network participant session and message processing module generates the failure delivery notification message.

4. The method as claimed in claim 2, wherein said message delivery notification is received from the converged service client of the destination user by said destination user's home network participant session and message processing module, and after receiving said message, said converged service client of the destination user sends the message delivery notification to said destination user's home network participant session and message processing module.

5. The method as claimed in claim 2, wherein, when there are a plurality of destination users, said network controller session and message processing module sets a waiting time when receiving the first message delivery notification returned by said plurality of destination users, and, after the waiting time is due, combines a plurality of message delivery notifications returned by said plurality of destination users and sends the combined message delivery notification to the sender's home network participant session and message processing module.

6. The method as claimed in claim 2, wherein:

when there are a plurality of destination users, said network controller session and message processing module directly forwards a plurality of message delivery notifications returned by said plurality of destination users to the sender's home network participant session and message processing module.

7. The method as claimed in claim 2, said method further comprising:

when receiving a repeated message delivery notification, said network controller session and message processing module discarding the repeated message delivery notification, or directly forwarding the repeated message delivery notification to the sender's home network participant session and message processing module.

8. The method as claimed in claim 2, wherein said sender converged service client, the sender's home network participant session and message processing module, the network controller session and message processing module, the destination user's home network participant session and message processing module, and the converged service client of said destination user interact with one another through a Session Initiation Protocol/Internet Protocol (SIP/IP) core bearer network.

9. The method as claimed in claim 8, wherein said message also includes a converged service identifier, and said sender converged service client sending the message to the sender's home network participant session and message processing module comprises the following steps of:

the sender converged service client sending the message to the SIP/IP core bearer network; and said SIP/IP core bearer network forwarding the message to the participant session and message processing module of the converged service system to which the sender belongs according to said converged service identifier.

10. The method as claimed in claim 9, wherein said sender's home network participant session and message processing module forwarding said message to the network controller session and message processing module according to the group identifier further comprises:

said sender's home network participant session and message processing module authenticating said sender, and sending the message to said SIP/IP core bearer network if the sender has permission to send the message;

the SIP/IP core bearer network sending said message to a home SIP/IP core bearer network of the converged service system to which group information belongs according to the group identifier, namely forwarding the message to a SIP/IP core bearer network managing the group; and the SIP/IP core bearer network managing the group sending said message to a network controller session and message processing module of the converged service system to which the group information belongs.

11. The method as claimed in claim 2, said method further comprising:

when said message includes indication information of requiring a message delivery notification and any one module among the sender's home network participant session and message processing module, the destination user's home network participant session and message processing module and said network controller session and message processing module requires blocking sending of the message delivery notification, the one module returning the message delivery notification to the sender converged service client to inform the sender that the system does not support the message delivery notification.

12. The method as claimed in claim 1, wherein said sender converged service client, the sender's home network participant session and message processing module, the network controller session and message processing module, the destination user's home network participant session and message processing module, and the converged service client of said destination user interact with one another through a Session Initiation Protocol/Internet Protocol (SIP/IP) core bearer network.

13. The method as claimed in claim 12, wherein said message also includes a converged service identifier, and said sender converged service client sending the message to the sender's home network participant session and message processing module comprises the following steps of:
the sender converged service client sending the message to the SIP/IP core bearer network; and
said SIP/IP core bearer network forwarding the message to the participant session and message processing module of the converged service system to which the sender belongs according to said converged service identifier.

14. The method as claimed in claim 13, wherein said sender's home network participant session and message processing module forwarding said message to the network controller session and message processing module according to the group identifier further comprises:
said sender's home network participant session and message processing module authenticating said sender, and sending the message to said SIP/IP core bearer network if the sender has permission to send the message;
the SIP/IP core bearer network sending said message to a home SIP/IP core bearer network of the converged service system to which group information belongs according to the group identifier, namely forwarding the message to a SIP/IP core bearer network managing the group; and
the SIP/IP core bearer network managing the group sending said message to a network controller session and message processing module of the converged service system to which the group information belongs.

15. The method as claimed in claim 1, said method further comprising:
when said message includes indication information of requiring a message delivery notification and any one module among the sender's home network participant session and message processing module, the destination user's home network participant session and message processing module and said network controller session and message processing module requires blocking sending of the message delivery notification, the one module returning the message delivery notification to the sender converged service client to inform the sender that the system does not support the message delivery notification.

16. The method as claimed in claim 1, wherein a group corresponding to the group identifier comprises more than two participants.

17. A system for implementing a group message service based on a converged service system, the system comprising:
a sender's home network device which comprises a processor configured with a sender's home network participant session and message processing module, a network controller device which comprises a processor configured with a network controller session and message processing module, and a destination user's home network device which comprises a processor configured with a destination user's home network participant session and message processing module, wherein:
the sender's home network participant session and message processing module is configured to receive a message from a sender converged service client of a user which has joined a group in the group message service, authenticate the sender and judge whether the sender has permission to send the message, and when the sender has the permission to send the message, forward said message to the network controller session and message processing module according to a group identifier of said group included in said message;
the network controller session and message processing module is responsible for routing processing for sessions and messages and is configured to:
receive a message from a participant session and message processing module, and after receiving said message from the sender's home network participant session and message processing module, judge whether said group is managed by a local domain of the network controller session and message processing module according to the group identifier, and if not, forward said message to a network controller session and message processing module of the converged service system to which the group identifier belongs; and
when determining that said group is managed by the local domain, judge whether the sender has permission to send the message to the group, when the sender has the permission to send the message to the group, authorize the sender, and forward said message to the destination user's home network participant session and message processing module, wherein the destination user corresponds to the group identifier;
the destination user's home network participant session and message processing module is configured to forward said message to a converged service client of said destination user;
thereby the converged service clients which belong to the converged service system and have joined the same group implementing the group message service.

18. The system as claimed in claim 17, the system further comprising:
a SIP/IP core bearer network, which is used to bear message interaction among said sender converged service client, the sender's home network participant session and message processing module, the network controller session and message processing module, the destination user's home network participant session and message processing module, and the converged service client of said destination user.

19. The system as claimed in claim 17, wherein said destination user's home network participant session and message processing module also sends a message delivery notification to said network controller session and message processing module;
said network controller session and message processing module receives said message delivery notification, and when there are a plurality of destination users and said network controller session and message processing module receives the first message delivery notification returned by said plurality of destination users, said network controller session and message processing module sets a waiting time and combines a plurality of message delivery notifications returned by said plurality of destination users when the waiting time is due, and then sends the combined message delivery notification to the sender's home network participant session and message processing module; and
said sender's home network participant session and message processing module sends said message delivery notification to said sender converged service client.

20. The system as claimed in claim 17, wherein a group corresponding to the group identifier comprises more than two participants.

\* \* \* \* \*